(12) United States Patent
Satoh et al.

(10) Patent No.: US 11,173,964 B2
(45) Date of Patent: Nov. 16, 2021

(54) VEHICLE BODY FRONT STRUCTURE

(71) Applicant: HONDA MOTOR CO., LTD., Tokyo (JP)

(72) Inventors: Ken Satoh, Saitama (JP); Keisuke Gonda, Saitama (JP); Akira Haga, Saitama (JP); Takashi Nitta, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/010,004

(22) Filed: Sep. 2, 2020

(65) Prior Publication Data

US 2021/0061368 A1    Mar. 4, 2021

(30) Foreign Application Priority Data

Sep. 4, 2019  (JP) .............................. JP2019-161279

(51) Int. Cl.
| | | |
|---|---|---|
| *B62D 25/02* | (2006.01) | |
| *B62D 25/14* | (2006.01) | |
| *B62D 25/16* | (2006.01) | |
| *B62D 25/08* | (2006.01) | |
| *B62D 21/15* | (2006.01) | |

(52) U.S. Cl.
CPC ............. *B62D 25/14* (2013.01); *B62D 25/02* (2013.01); *B62D 25/088* (2013.01); *B62D 25/16* (2013.01); *B62D 21/152* (2013.01)

(58) Field of Classification Search
CPC ........ B62D 25/14; B62D 25/02; B62D 25/16; B62D 25/088; B62D 21/152; B62D 27/02; B62D 25/082; B62D 25/08; B62D 25/145

USPC ............................................................ 296/70
See application file for complete search history.

(56) References Cited

U.S. PATENT DOCUMENTS

| | | | | |
|---|---|---|---|---|
| 2014/0001332 A1* | 1/2014 | Sakai | ............... | B60K 15/03177 248/311.2 |
| 2015/0166117 A1* | 6/2015 | Ohoka | ................... | B62D 25/08 296/193.09 |
| 2018/0170434 A1* | 6/2018 | Saito | ..................... | B62D 25/088 |
| 2019/0039652 A1* | 2/2019 | Kamei | ................. | B62D 25/081 |

FOREIGN PATENT DOCUMENTS

JP        2016016848 A     2/2016

* cited by examiner

*Primary Examiner* — Pinel E Romain
(74) *Attorney, Agent, or Firm* — Armstrong Teasdale LLP

(57) ABSTRACT

In a vehicle body front structure including a dashboard panel (10), a damper housing (18) attached to a front side of the dashboard panel, and a component mounting part reinforcing plate (24) attached to the dashboard panel, a dashboard panel reinforcing plate (40, 48, 50) extends between the attachment part of the dashboard panel for the vehicle body structure member and the attachment part of the dashboard panel for the component mounting part reinforcing plate, and is attached to the dashboard panel. The dashboard panel reinforcing plate is adjacent to or overlaps with the attachment part of the dashboard panel for the vehicle body structure member of the dashboard panel without being attached to the vehicle body structure member, and has a part (40B) attached to or adjacent to the component mounting part reinforcing plate.

14 Claims, 9 Drawing Sheets

VEHICLE BODY FRONT STRUCTURE

TECHNICAL FIELD

The present invention relates to a vehicle body front structure, and in particular to a vehicle body front structure including a dashboard panel.

BACKGROUND ART

A front part of a vehicle body, such as a vehicle body of an automobile, is provided with a dashboard panel that faces in the fore and aft direction, and separates the engine compartment and the vehicle cabin from each other. To prevent excessive deformation of the dashboard panel at the time of a vehicle crash, it is known to attach a reinforcing panel to the dashboard panel by spot welding or the like. See JP2016-16848A, for instance.

In such a vehicle body front structure, the reinforcing panel, which simply overlaps with and is attached to the dashboard panel, is required to have a large thickness and a large area in order to prevent the breaking of the dashboard panel by a crash load.

SUMMARY OF THE INVENTION

In view of such a problem of the prior art, a primary object of the present invention is to provide a vehicle body front structure that can effectively prevent the breaking or rupturing of the dashboard panel at the time of a crash without unduly increasing the material cost and the weight of the vehicle body.

To achieve such an object, one embodiment of the present invention provides a vehicle body front structure, comprising: a dashboard panel (10) provided in a front part of a vehicle body so as to face in a fore and aft direction; a vehicle body structure member (18) attached to a front side of the dashboard panel at an attachment part (Wa) of the dashboard panel; a component mounting part reinforcing plate (24) attached to a region of the dashboard panel in which a vehicle component (26) is mounted at an attachment part (Wb) of the dashboard panel; and a dashboard panel reinforcing plate (40, 48, 50) extending between the attachment part of the dashboard panel for the vehicle body structure member and the attachment part of the dashboard panel for the component mounting part reinforcing plate, and attached to the dashboard panel, the dashboard panel reinforcing plate being adjacent to or overlapping with the attachment part of the dashboard panel for the vehicle body structure member without being attached to the vehicle body structure member, and having a part (40B) attached to or adjacent to the component mounting part reinforcing plate.

In the above structure, the dashboard panel reinforcing plate extends between the attachment part at which the vehicle body structure member is attached to the dashboard panel and the attachment part at which the component mounting part reinforcing plate is attached to the dashboard panel without the dashboard panel reinforcing plate being attached to the vehicle body structure member. Therefore, at the time of a frontal crash, the dashboard panel can be dislodged from the vehicle body structure member without being hindered by the dashboard panel reinforcing plate so that creation of tears or cuts (ruptures) in the dashboard panel can be avoided, and the dashboard panel is prevented from uncontrollably breaking at such a time. The vehicle component typically consists of a brake master cylinder which may be electrically actuated.

In this vehicle body front structure, preferably, the component mounting part reinforcing plate and the dashboard panel reinforcing plate consist of a single integral plate member.

Thereby, the number of components can be reduced.

In this vehicle body front structure, preferably, the attachment part of the dashboard panel for the vehicle body structure member includes a spot welded part that joins the vehicle body structure member to the dashboard panel, and the dashboard panel reinforcing plate is provided with an opening (42) or a notch (46) exposing the spot welded part.

The opening or the notch ensures that the dashboard panel reinforcing plate is not directly attached to the vehicle body structure member. The opening or the notch may consist of a plurality of openings or notches each surrounding a corresponding individual spot weld.

In this vehicle body front structure, preferably, the attachment part of the dashboard panel for the vehicle body structure member includes a spot welded part that joins the vehicle body structure member to the dashboard panel, and the dashboard panel reinforcing plate is provided with a recess (44) facing the spot welded part so as to space a part of the dashboard panel reinforcing plate corresponding to the recess away from the spot welded part.

The recess ensures that the dashboard panel reinforcing plate is not directly attached to the vehicle body structure member.

In this vehicle body front structure, preferably, the dashboard panel reinforcing plate extends laterally of the vehicle body, and the attachment part (Wa) of the dashboard panel for the vehicle body structure member and the attachment part (Wb) of the dashboard panel for the vehicle component are laterally spaced from each other.

Thereby, the dashboard panel reinforcing plate can effectively prevent the dashboard panel from being ripped or cut while allowing the dashboard panel to be detached from the vehicle body structure member in a controlled manner at the time of a frontal vehicle crash.

In this vehicle body front structure, preferably, the attachment part of the dashboard panel for the vehicle body structure member includes a plurality of spot welds arranged laterally along an upper edge of the dashboard panel.

Thereby, the spot welds are caused to be broken one after another in a sequential manner at the time of a frontal crash so that stress concentration is minimized, and the dashboard panel is prevented from being ripped or cut in an incontrollable manner.

In this vehicle body front structure, preferably, the dashboard panel reinforcing plate (48, 50) includes a laterally elongated plate member positioned so as to be vertically offset from the attachment part of the dashboard panel for the vehicle body structure member.

Thereby, the dashboard panel reinforcing plate can effectively prevent the dashboard panel from being ripped or cut while allowing the dashboard panel to be detached from the vehicle body structure member in a controlled manner at the time of a frontal vehicle crash. The dashboard panel reinforcing plate may consist of a pair of laterally elongated plate members positioned above and below the attachment part of the dashboard panel for the vehicle body structure member, respectively.

In this vehicle body front structure, preferably, the vehicle body structure member includes a damper housing (18) of a front suspension device.

Thereby, the dashboard panel is prevented from being ripped or cut while the dashboard panel is allowed to be detached from the damper housing in a controlled manner at the time of a frontal vehicle crash.

In this vehicle body front structure, preferably, the dashboard panel reinforcing plate has a greater thickness than the dashboard panel.

Thereby, the dashboard panel is prevented from being ripped or cut, and is enabled to absorb a maximum amount of energy at the time of a frontal vehicle crash.

Preferably, this vehicle body front structure is further provided with a side panel (12) extending vertically along a laterally outer edge of the dashboard panel, and the side panel is attached to the laterally outer edge of the dashboard panel by a plurality of spot welds (Wd) arranged in a vertical row.

Thereby, the spot welds between the dashboard panel and the side panel are caused to be broken one after another in a sequential manner at the time of a frontal crash so that stress concentration is minimized, and the dashboard panel is prevented from being ripped or cut in an incontrollable manner.

Preferably, a lateral edge part of the dashboard panel is provided with a front wheel house portion (10B) bulging toward a cabin of the vehicle, and the vehicle body front structure further includes a side reinforcing plate (13, 15) which is attached to both the side panel and the dashboard panel in a part of the lateral edge part of the dashboard panel adjacent to an upper end of the front wheel house portion.

Thus, the side reinforcing plate prevents the joint between the dashboard panel and the side panel from being broken in a sequential manner beyond a certain point along the lateral edge of the dashboard panel at the time of a frontal vehicle crash so that the part of the joint located below the side reinforcing plate and adjacent to the feet of the vehicle occupant is prevented from being broken.

The present invention thus provides a vehicle body front structure that can effectively prevent the breaking of the dashboard panel at the time of a crash without unduly increasing the material cost and the weight of the vehicle body.

BRIEF DESCRIPTION OF THE DRAWING(S)

DESCRIPTION OF THE PREFERRED EMBODIMENT(S)

Figure 1:
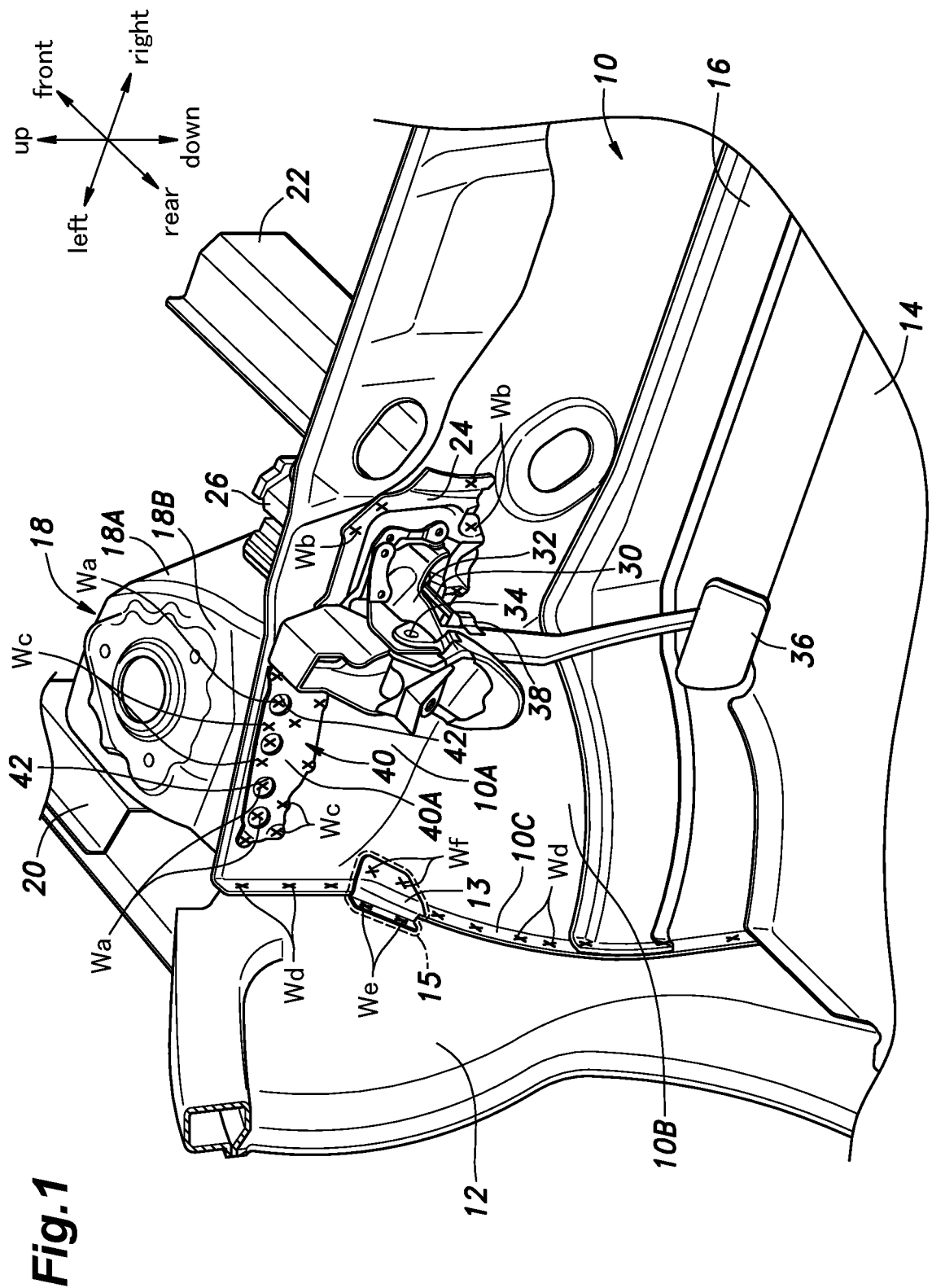
FIG. 1 is a fragmentary perspective of a vehicle body front structure according to a first embodiment of the present invention as viewed from inside the vehicle.

A vehicle body front structure according a first embodiment of the present invention is described in the following with reference to FIGS. 1 to 4. This vehicle is a left hand driving vehicle, but the present invention is equally applicable to a right hand driving vehicle. In the latter case, the arrangement will be a mirror image of what is about to be described in the following.

The vehicle body front structure according to this embodiment is provided with a dashboard panel 10 facing in the fore and aft direction to separate an engine compartment from a cabin of the vehicle.

The dashboard panel 10 includes a substantially flat main part 10A, and a pair of front wheel house portions 10B bulging into the cabin in either lower side part thereof. Each lateral side edge of the dashboard panel 10 that extends substantially over the entire height of the dashboard panel 10 is defined by a side edge of the main part 10A and a side edge of the corresponding front wheel house portion 10B. Each lateral edge of the dashboard panel 10 is provided with a flange 10C extending in the rearward direction.

A pair of side panels 12 are joined to the side edges of the dashboard panel 10, respectively, via the corresponding flanges 10C. More specifically, each side panel 12 is attached to the corresponding flange 10C of the dashboard panel 10 at a plurality of spot welds (attachment part Wd) which are arranged vertically in a single row at regular intervals.

Each side edge of the dashboard panel 10 consists of a side edge of the main part 10A and a side edge of the front wheel house portion 10B. In a part of the side edge of the dashboard panel 10 located on the boundary between the main part 10A and the front wheel house portion 10B, a side reinforcing plate 13 consisting of a stamp formed sheet metal conforming to the corresponding parts of the dashboard panel 10 and the corresponding side panel 12 is attached to the side edge of the dashboard panel 10 and the corresponding side panel 12 by spot welding. More specifically, the side reinforcing plate 13 straddles over the rear surface of the dashboard panel 10 and the inner surface of the corresponding side panel 12, and is spot welded to the dashboard panel 10 by a plurality of spot welds (attachment part We) and to the corresponding side panel 12 by a plurality of spot welds (attachment part Wf).

Furthermore, another side reinforcing plate 15, similar to the side reinforcing plate 13, straddles over the front surface of the dashboard panel 10 and the outer surface of the corresponding side panel 12, and is spot welded to the dashboard panel 10 and the side panel 12. These two side reinforcing plates 13 and 15 substantially conformally overlap with each other.

The lower edge of the dashboard panel 10 is connected to the front edge of a floor panel 14 extending under the cabin. A cross member 16 extending in the lateral direction is attached to the rear surface of a lower part of the dashboard panel 10.

Each lateral end part of the dashboard panel 10, in particular the main part 10A thereof, is connected to a damper housing 18 (vehicle body structure member) for the corresponding front suspension device. An upper part of the damper housing 18 is connected to a corresponding side upper member 20, and a lower part of the damper housing 18 is connected to a corresponding side member 22.

Each damper housing 18 is provided with a side member 18A forming a front wall and a side wall, and a damper base member 18B connected to the upper edge of the side member 18A to form an upper wall. The rear edge of the damper base member 18B is provided with a flange extending downward, and is connected to an upper edge (the front surface thereof) of the main part 10A of the dashboard panel 10 via the flange at a plurality of spot welds (attachment part Wa) arranged laterally at regular intervals.

A rectangular or polygonal component mounting part reinforcing plate 24 is attached to the rear surface of a prescribed part (mounting part) of the main part 10A of the dashboard panel 10 at a plurality of spot welds (attachment part Wb). The component mounting part reinforcing plate 24 is located laterally more inward than the corresponding damper housing 18, and in particular, the spot welds of the attachment part Wb are all located more laterally inward than the attachment part Wa at which the damper housing 18 is attached to the dashboard panel 10. In other words, the attachment part Wa of the damper housing 18 and the attachment part Wb of the component mounting part reinforcing plate 24 are laterally spaced from each other.

Figure 2:
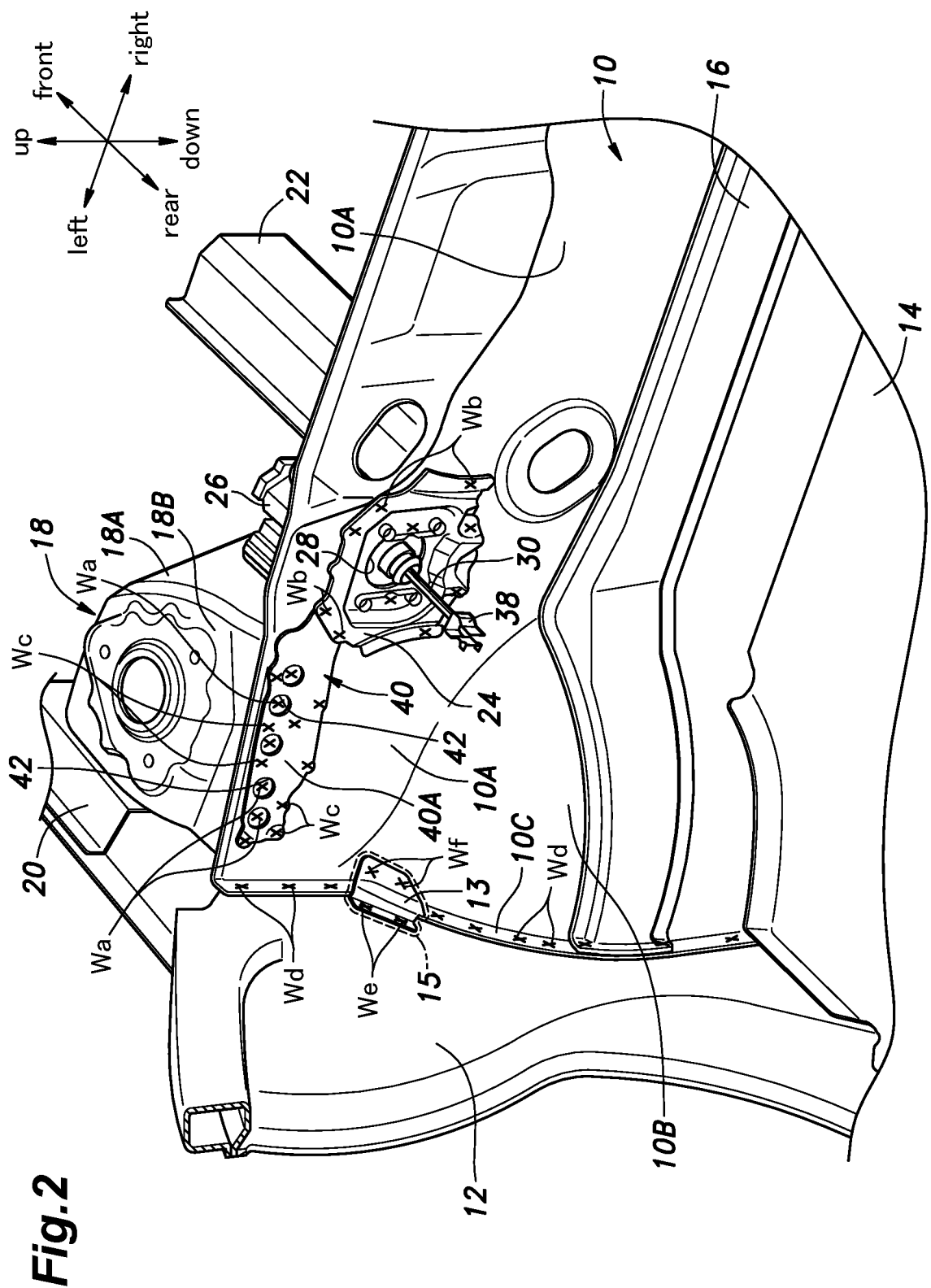
FIG. 2 is a view similar to FIG. 1 with a brake pedal device omitted from illustration.
Figure 3:
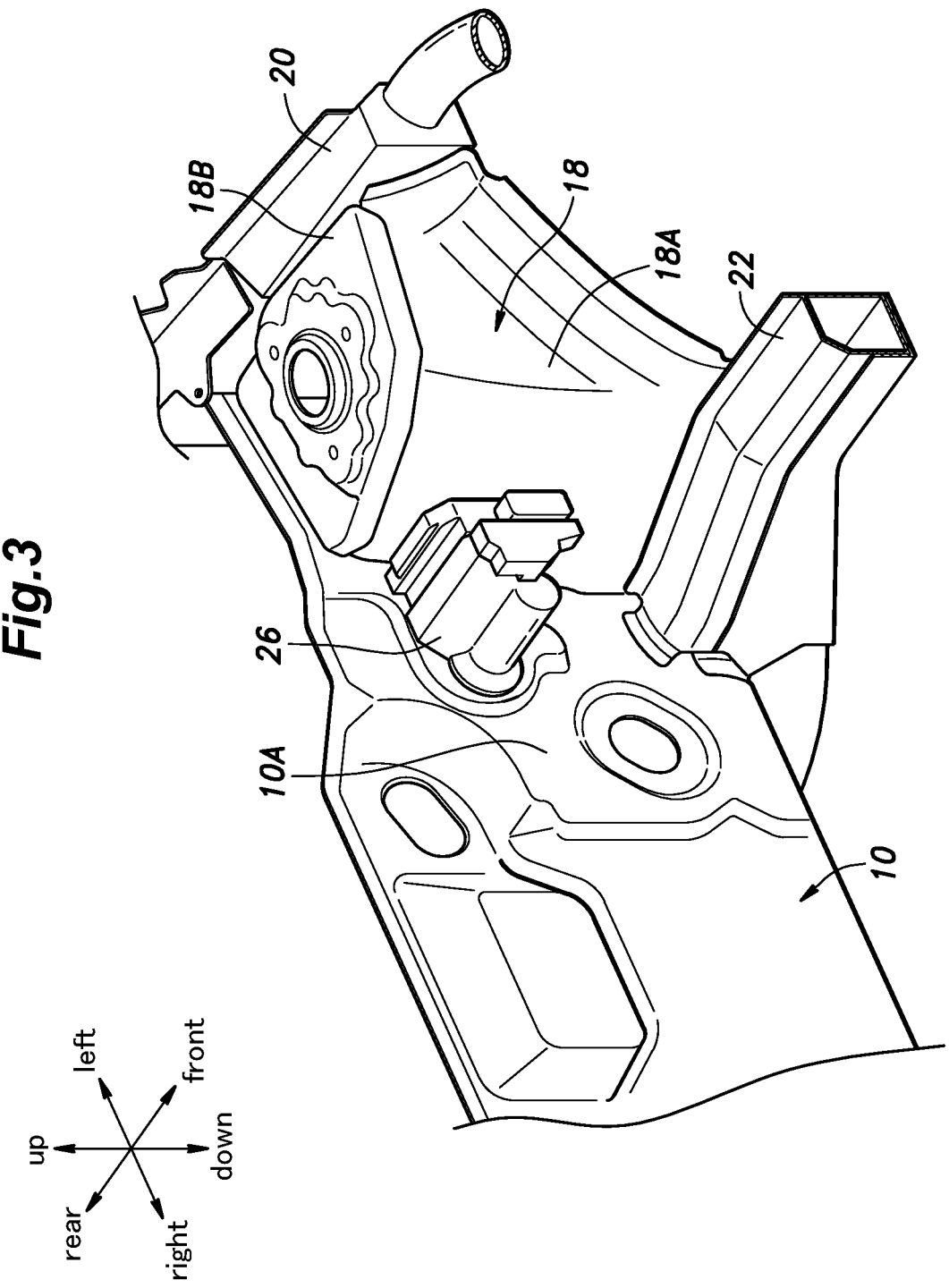
FIG. 3 is a fragmentary perspective of the vehicle body front structure as viewed from outside the vehicle.

An electric brake master cylinder device 26 is mounted on the front surface of the dashboard panel 10 at a position corresponding to the component mounting part reinforcing plate 24 by using screws not shown in the drawings. The electric brake master cylinder device 26 includes a base end fixed to the front surface of the dashboard panel 10 and protruding forward. As shown in FIG. 2, a through hole 28 is passed through the main part 10A of the dashboard panel 10 and the component mounting part reinforcing plate 24, and a piston rod 30 of the electric brake master cylinder device 26 extends rearward through the through hole 28.

As shown in FIG. 1, a pedal support bracket 32 is attached to the component mounting part reinforcing plate 24 to pivotally support a brake pedal 36 via a pivot axis 34. The brake pedal 36 engages an engagement member 38 fitted to the free end or the rear end of the piston rod 30 so that the piston rod 30 may be pushed forward by depressing the brake pedal 36 in a per se known manner.

A dashboard panel reinforcing plate 40 is attached to the rear surface (facing the cabin) of a part of the main part 10A of the dashboard panel 10 located to the left of the component mounting part reinforcing plate 24 by a plurality spot welds (attachment part Wc). The dashboard panel reinforcing plate 40 consists of a generally planar laterally elongated plate having a greater thickness than the dashboard panel 10.

Figure 4:
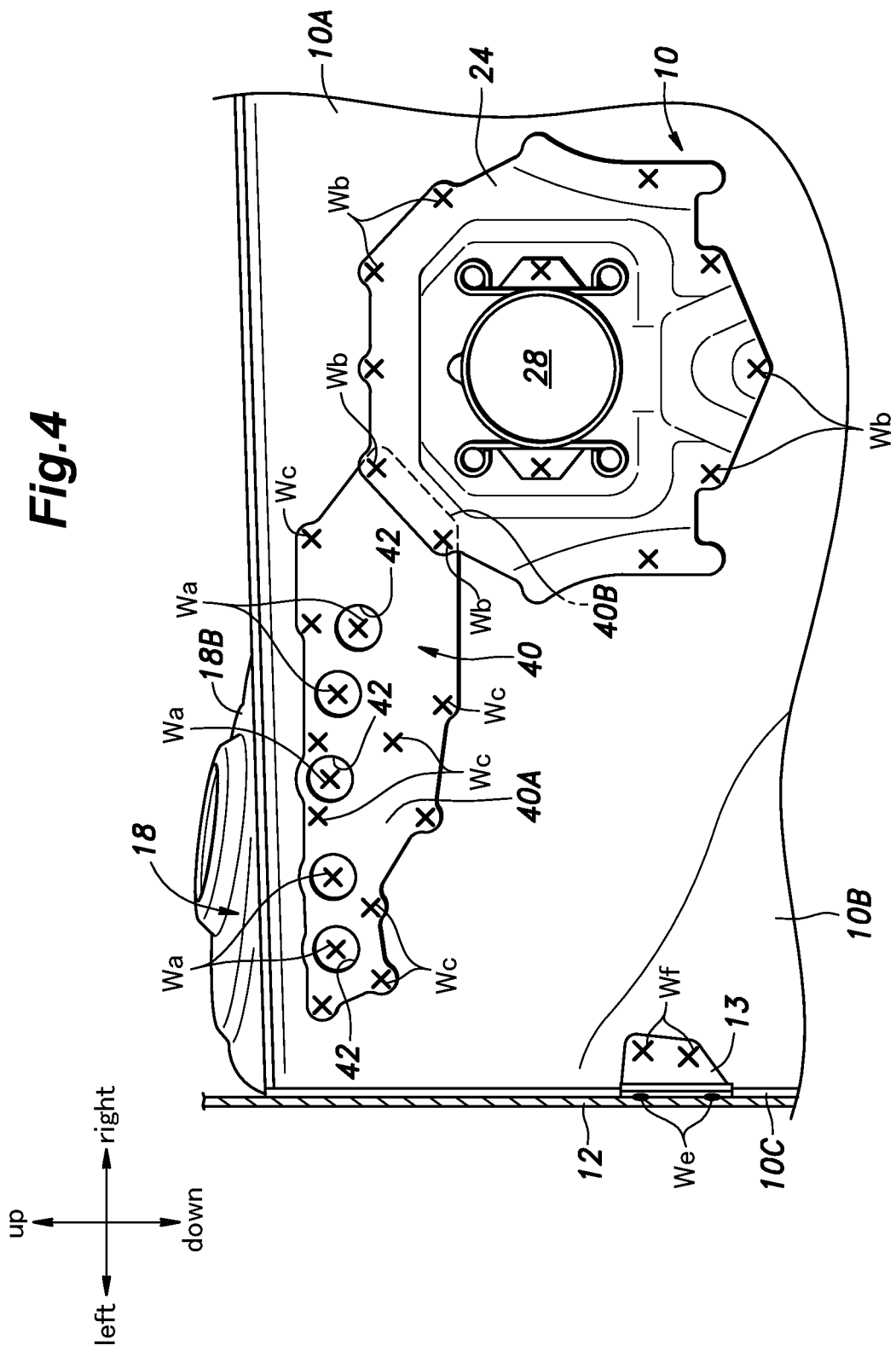
FIG. 4 is an enlarged fragmentary front view of the vehicle body front structure as viewed from inside the vehicle.

As most clearly shown in FIG. 4, the dashboard panel reinforcing plate 40 includes a main part 40A which is attached to the rear surface of the dashboard panel 10 by spot welds (attachment part Wc) which attaches the main part 40A to the dashboard panel 10, but not to the damper housing 18, and an extension 40B which overlaps with an upper left corner part of the component mounting part reinforcing plate 24, and is attached thereto by spot welds which connect the extension 40B to both the component mounting part reinforcing plate 24 and the dashboard panel 10.

The dashboard panel reinforcing plate 40 is provided with openings 42 at positions corresponding to the respective spot welds (attachment part Wa) that attach the dashboard panel 10 to the damper housing 18 so as to expose the spot welds. These openings 42 allow the dashboard panel 10 to the damper housing 18 to be spot welded to each other while the dashboard panel reinforcing plate 40 is spot welded only to the dashboard panel 10. Thus, in this embodiment, the dashboard panel reinforcing plate 40 is attached only to the dashboard panel 10, and no part of the dashboard panel reinforcing plate 40 is directly attached to the damper housing 18.

According to the vehicle body front structure of this embodiment, since the dashboard panel reinforcing plate 40 is provided between the attachment part Wa at which the dashboard panel 10 is attached to the damper housing 18, and the attachment part Wb at which the component mounting part reinforcing plate 24 is attached to the dashboard panel 10, at the time of a frontal crash, the dashboard panel 10 is prevented from breaking in the part thereof located between these two attachment parts Wa and Wb.

Since the dashboard panel reinforcing plate 40 is attached to the dashboard panel 10, but not to the damper housing 18, at the time of a frontal vehicle crash, the attachment part Wa is preferentially broken, and the dashboard panel 10 is allowed to be detached from the damper housing 18 without being impeded by the dashboard panel reinforcing plate 40. Thus, the dashboard panel 10 is prevented from being torn or cut at the time of a frontal vehicle crash.

To ensure such a behavior of the vehicle body front structure at the time of a frontal vehicle crash, the dashboard panel reinforcing plate 40 extends laterally between the attachment part Wa and the attachment part Wb, and is attached to the dashboard panel 10. However, the dashboard panel reinforcing plate 40 is not attached to the damper housing 18. The dashboard panel reinforcing plate 40 is not required to have a large thickness, but can effectively prevent the tearing or cutting of the dashboard panel 10 at the time of a frontal vehicle crash, and absorb the impact energy of the frontal vehicle crash without increasing the weight of the vehicle or increasing the material cost.

Because the dashboard panel reinforcing plate 40 extends adjacent to the spot welds of the attachment part Wa, the parts surrounding the spot welds are favorably reinforced so that the impact energy of a vehicle crash can be favorably absorbed by the breaking of the spot welds without causing tears or cuts in the dashboard panel 10.

The attachment part Wa between the dashboard panel 10 and the damper housing 18, and the attachment part Wb between the dashboard panel 10 and the component mounting part reinforcing plate 24 are laterally spaced from each other so that the dashboard panel 10, the damper housing 18 and the component mounting part reinforcing plate 24 are not directly connected to one another. Therefore, at the time of a frontal vehicle crash, the component mounting part reinforcing plate 24 is prevented from hindering the breaking of the attachment part Wa between the dashboard panel 10 and the damper housing 18.

Since the thickness of the dashboard panel reinforcing plate 40 is greater (thicker) than the thickness of the dashboard panel 10, the attachment part Wa between the dashboard panel 10 and the damper housing 18 is more likely to break than the attachment part Wb between the dashboard panel 10 and the dashboard panel reinforcing plate 40 so that the impact energy of the frontal vehicle crash can be absorbed in a favorable manner without causing tears or cuts in the dashboard panel 10.

Since the attachment part Wa between the dashboard panel 10 and the damper housing 18 includes a plurality laterally arranged spot welds, at the time of a frontal vehicle crash, the attachment part Wa breaks off in a sequential manner in the lateral direction so that stress concentration can be minimized. As a result, the dashboard panel 10 is prevented from being ripped or cut at such a time.

Since the attachment part Wd between the dashboard panel 10 and the side panel 12 includes a plurality vertically arranged spot welds, at the time of a frontal vehicle crash, the attachment part Wd breaks off in a sequential manner in the vertical direction so that stress concentration can be minimized. As a result, the dashboard panel 10 is prevented from being ripped or cut at such a time.

The breaking of the attachment part Wd which progresses sequentially in the downward direction is resisted by the side reinforcing plates 13 and 15 so that the part of the attachment part Wd located below the side reinforcing plates 13 and 15 is prevented from breaking under normal frontal crash situations. Therefore, the chance of the dashboard panel 10 breaking near the feet of the vehicle occupant at the time of a frontal vehicle crash can be minimized.

Figure 5:
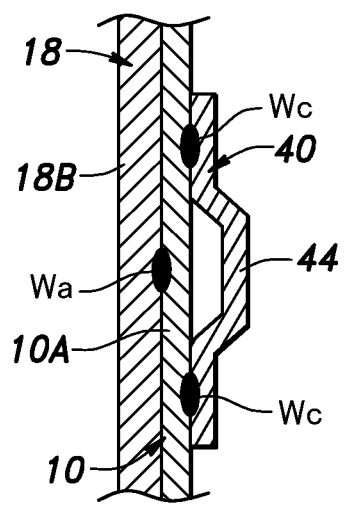
FIG. 5 is an enlarged fragmentary sectional view of the vehicle body front structure according to a second embodiment of the present invention.

In a second embodiment shown in FIG. 5, the damper housing 18 is not directly attached to the dashboard panel reinforcing plate 40 by providing a recess 44 in the part of the dashboard panel reinforcing plate 40 corresponding to the spot welds forming the attachment part Wa that connects the dashboard panel 10 to the damper housing 18. Thereby, the material of the dashboard panel reinforcing plate 40 is spaced away from the parts of the dashboard panel 10 at which the damper housing 18 is spot welded to the dashboard panel 10. In the description of this embodiment and other embodiments described in the following, the parts corresponding to those of the first embodiment are denoted with like numerals without necessarily repeating the description of such parts to avoid redundancy.

Figure 6:
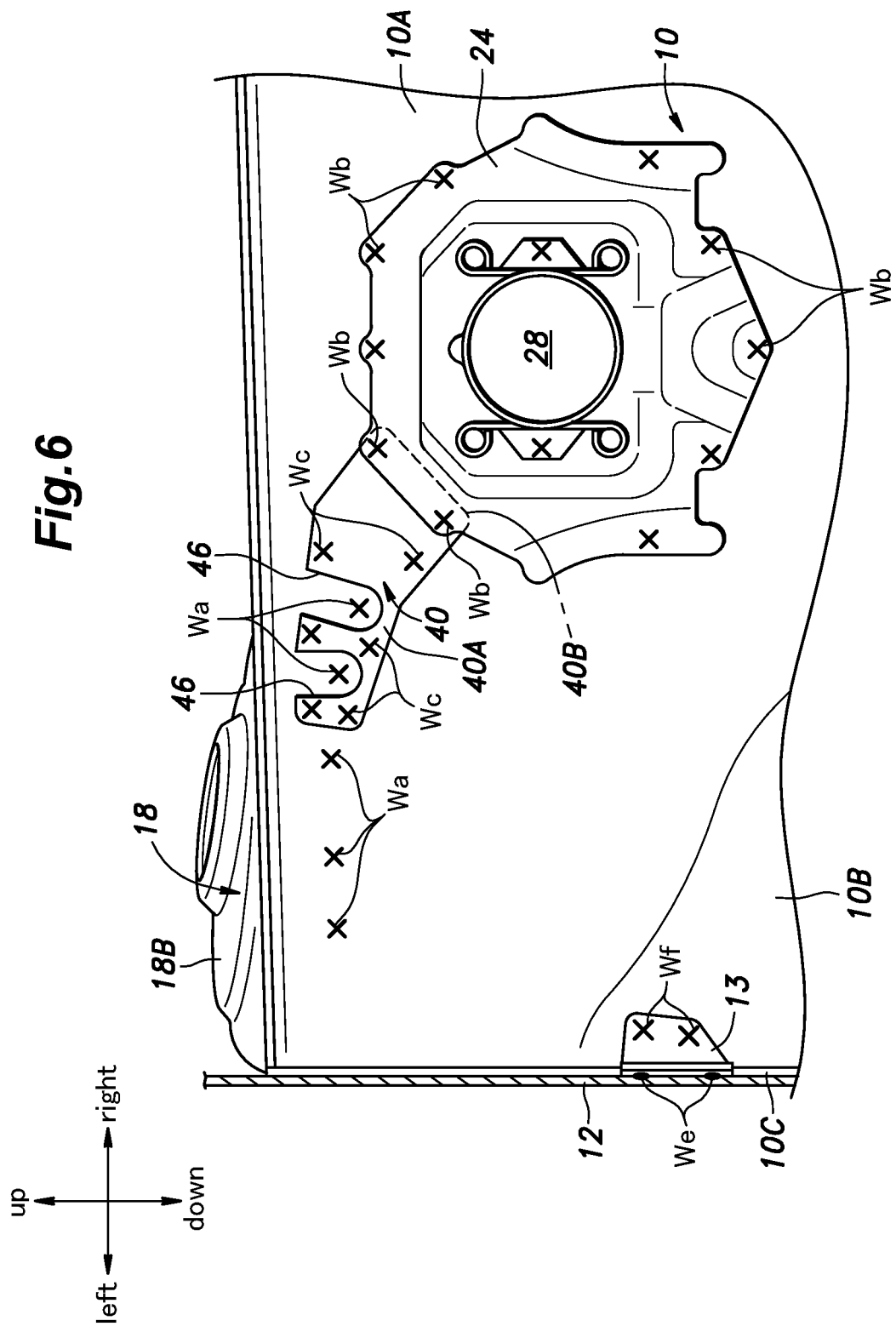
FIG. 6 is a view similar to FIG. 4 showing a third embodiment of the present invention.

In a third embodiment shown in FIG. 6, the damper housing 18 is not directly attached to the dashboard panel reinforcing plate 40 by providing a plurality of cutouts 46 (or notches) formed along the upper edge of the dashboard panel reinforcing plate 40 so as to correspond to the spot welds forming the attachment part Wa. Thereby, the material of the dashboard panel reinforcing plate 40 is spaced away from the parts of the dashboard panel 10 at which the damper housing 18 is spot welded to the dashboard panel 10. Additionally, the extension 40B of the dashboard panel reinforcing plate 40 overlaps with and welded to the component mounting part reinforcing plate 24 at the attachment part Wb at which the extension 40B of the dashboard panel reinforcing plate 40, the component mounting part reinforcing plate 24 and the dashboard panel 10 may be jointly spot welded to one another.

Figure 7:
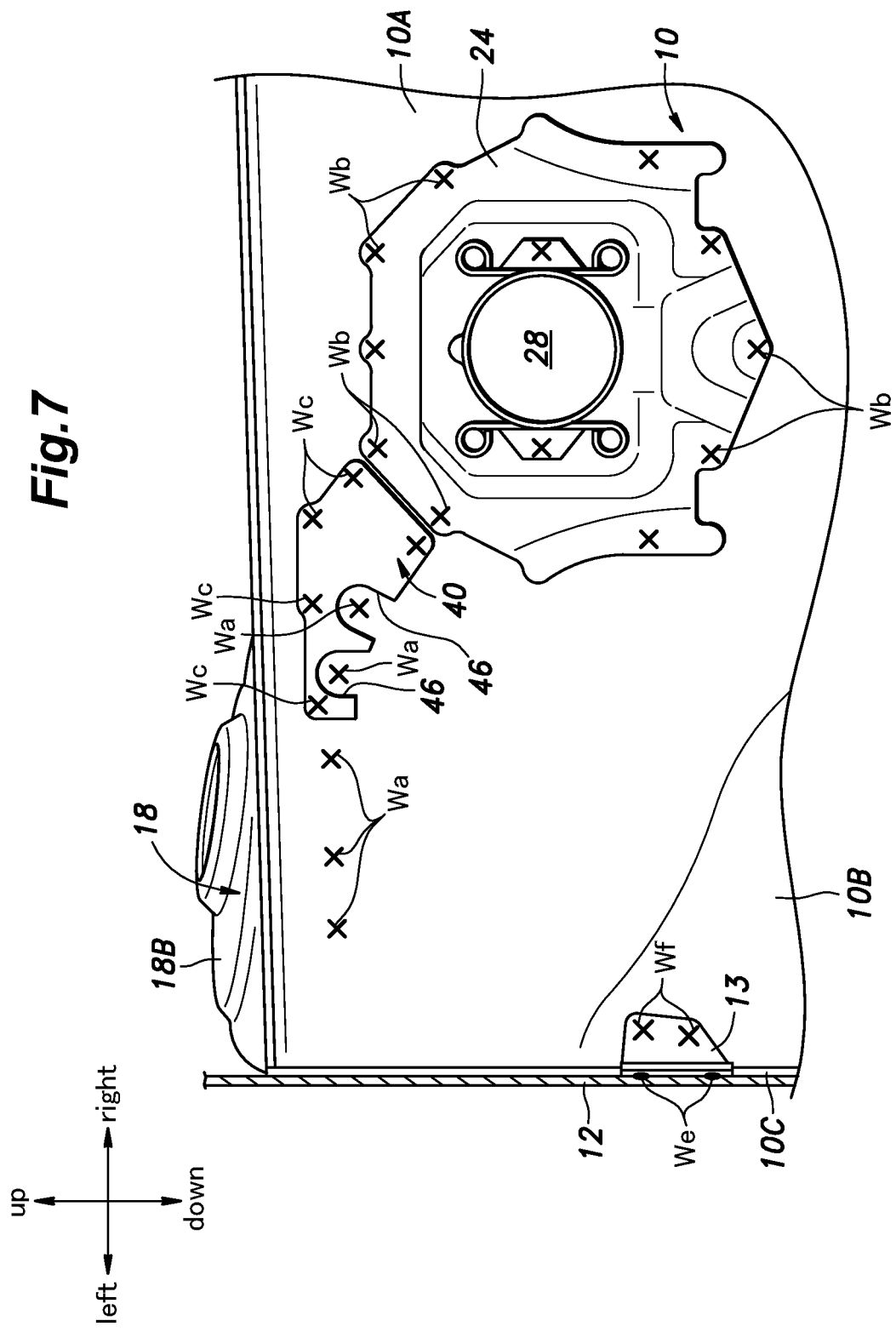
FIG. 7 is a view similar to FIG. 4 showing a fourth embodiment of the present invention.

In a fourth embodiment shown in FIG. 7, the damper housing 18 is not directly attached to the dashboard panel reinforcing plate 40 by providing a plurality of cutouts 46 (or notches) formed along the lower edge of the dashboard panel reinforcing plate 40 so as to correspond to the spot welds forming the attachment part Wa. Thereby, the material of the dashboard panel reinforcing plate 40 is spaced away from the parts of the dashboard panel 10 at which the damper housing 18 is spot welded to the dashboard panel 10. Additionally, the dashboard panel reinforcing plate 40 is positioned so as to be adjacent to but not overlapping with the component mounting part reinforcing plate 24.

Figure 8:
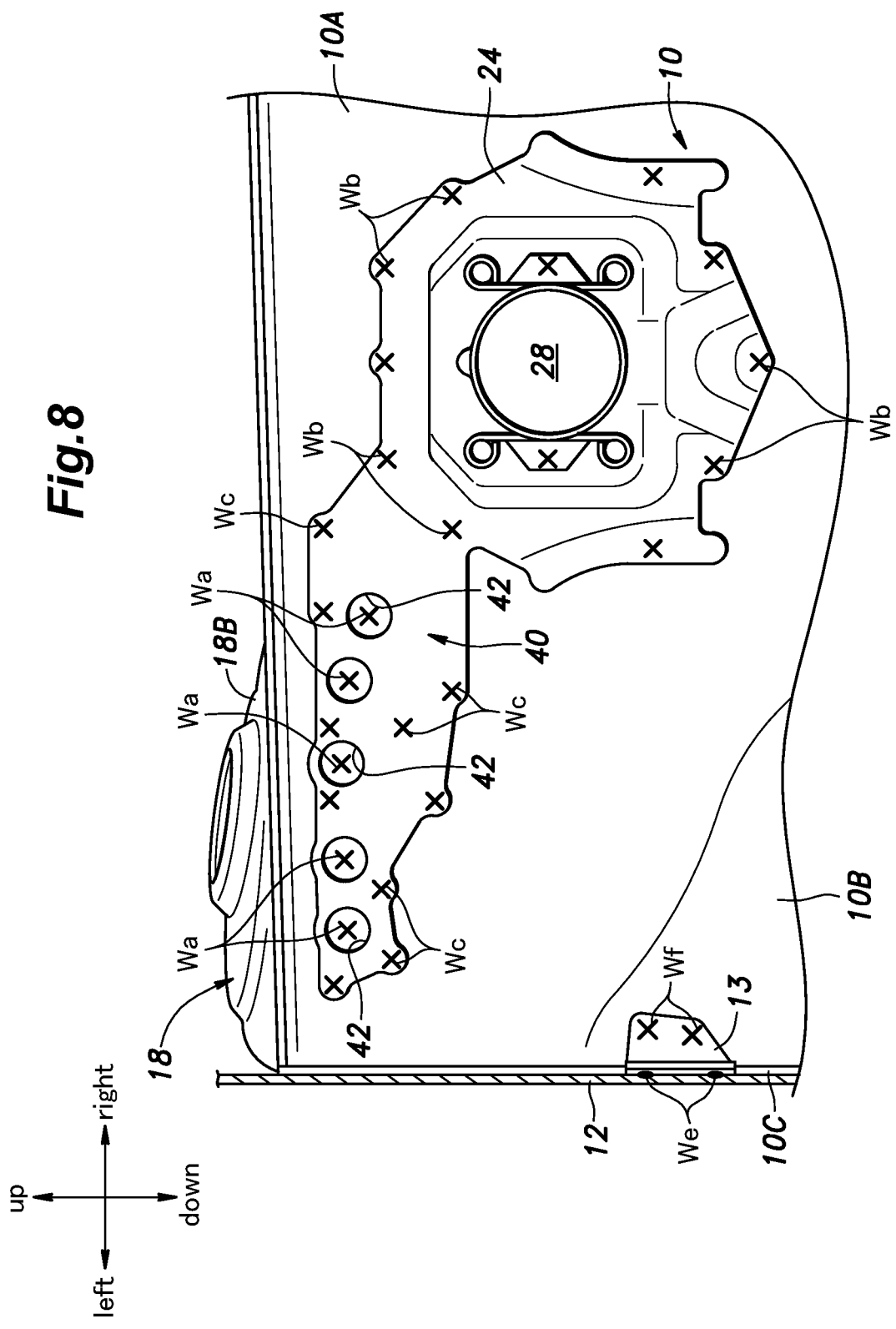
FIG. 8 is a view similar to FIG. 4 showing a fifth embodiment of the present invention.

In a fifth embodiment shown in FIG. 8, the dashboard panel reinforcing plate 40 and the component mounting part reinforcing plate 24 are formed by an integral single piece, stamp formed sheet metal. This embodiment thereby reduces the number of components.

Figure 9:
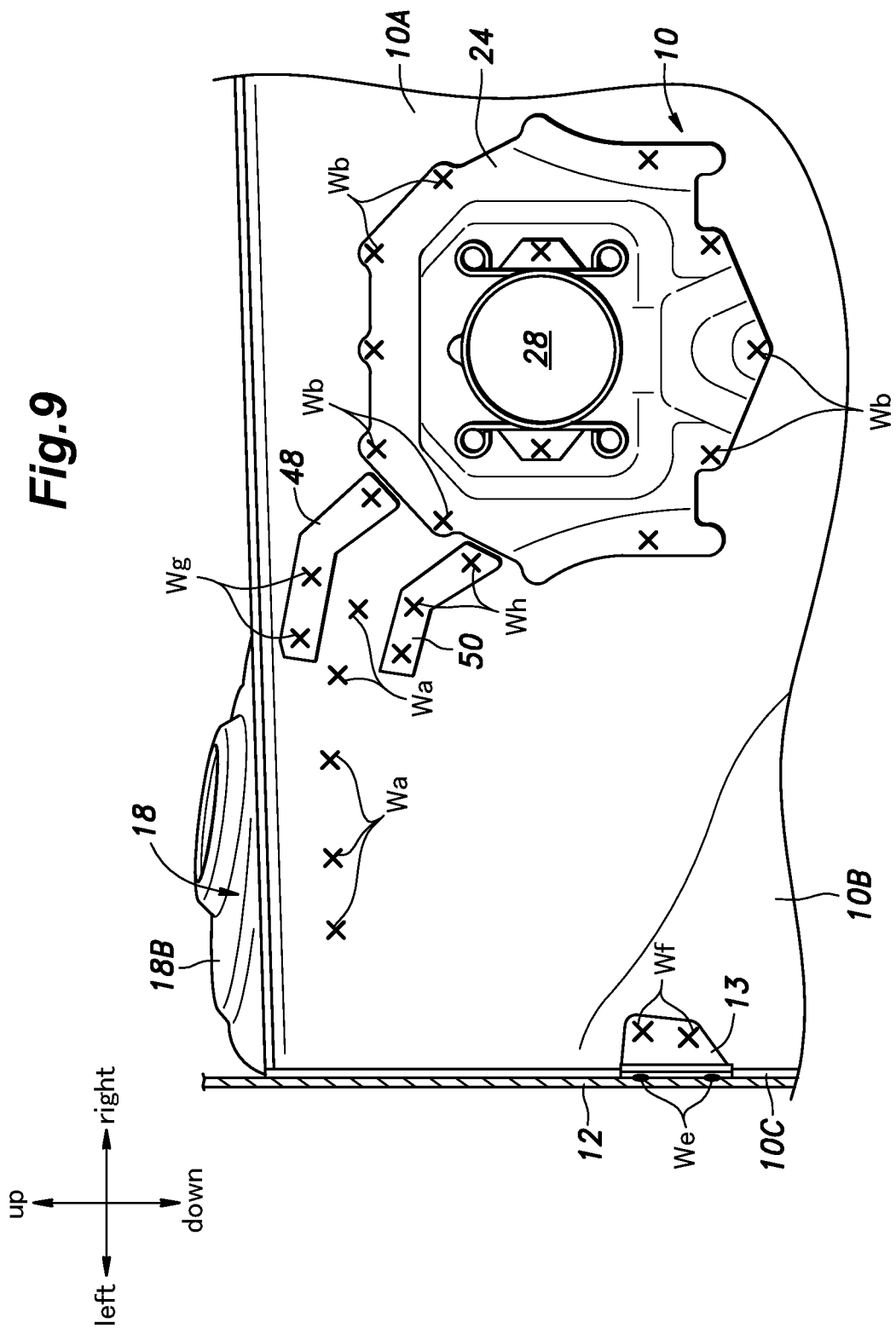
FIG. 9 is a view similar to FIG. 4 showing a sixth embodiment of the present invention.

In a sixth embodiment shown in FIG. 9, the dashboard panel reinforcing plate consists of a pair of laterally elongated dashboard panel reinforcing plates 48 and 50 that are positioned one above the other in a spaced apart relationship. These dashboard panel reinforcing plates 48 and 50 are each attached to the dashboard panel 10 at a plurality of spot welds (attachment parts Wg and Wh).

In this case also, the spot welds (Wa) that attach the damper housing 18 to the dashboard panel 10 do not overlap with the dashboard panel reinforcing plates 48 and 50 or the spot welds that attach the dashboard panel reinforcing plates 48 and 50 to the dashboard panel 10. Some of the spot welds (Wa) that attach the damper housing 18 to the dashboard panel 10 are located between the two dashboard panel reinforcing plates 48 and 50. If desired, one of the two dashboard panel reinforcing plates 48 and 50 may be omitted.

The present invention has been described in terms of specific embodiments, but can be modified and substituted in various ways without departing from the scope of the present invention. The various features of the different embodiments may be individually combined in a suitable manner to create a new embodiment without departing from the scope of the present invention.

For example, each attachment part Wa-Wh may not be formed by spot welding, but may also be formed by dots or lines of MIG, laser or other welding, or may also be formed screws or rivets. The lateral dimension and the shape of the dashboard panel reinforcing plate 40 may be selected by taking into account the various factors, such as thickness, shape and material of the dashboard panel 10, the damper housing 18, the dashboard panel reinforcing plate 40 and other vehicle body components.

The vehicle body structure member that is attached to the front surface of the dashboard panel 10 is not limited to the damper housing 18, but may also be a front wheelhouse or any other vehicle body structure member. The component attached to the component mounting part reinforcing plate 24 may not be limited to the electric brake master cylinder device 26, but may also be other on-board components such as a hydraulic brake master cylinder device.

The invention claimed is:

1. A vehicle body front structure, comprising:
   a dashboard panel provided in a front part of a vehicle body so as to face in a fore and aft direction;
   a vehicle body structure member attached to a front side of the dashboard panel at an attachment part of the dashboard panel;
   a component mounting part reinforcing plate attached to a region of the dashboard panel in which a vehicle component is mounted at an attachment part of the dashboard panel; and
   a dashboard panel reinforcing plate extending between the attachment part of the dashboard panel for the vehicle body structure member and the attachment part of the dashboard panel for the component mounting part reinforcing plate, and attached to the dashboard panel, the dashboard panel reinforcing plate being adjacent to or overlapping with the attachment part of the dashboard panel for the vehicle body structure member without being attached to the vehicle body structure member, and having a part attached to or adjacent to the component mounting part reinforcing plate.

2. The vehicle body front structure according to claim 1, wherein the component mounting part reinforcing plate and the dashboard panel reinforcing plate consist of a single integral plate member.

3. The vehicle body front structure according to claim 1, wherein the attachment part of the dashboard panel for the vehicle body structure member includes a spot welded part that joins the vehicle body structure member to the dashboard panel, and the dashboard panel reinforcing plate is provided with an opening or a notch exposing the spot welded part.

4. The vehicle body front structure according to claim 3, wherein the opening or the notch comprises a plurality of openings or notches each surrounding a corresponding individual spot weld.

5. The vehicle body front structure according to claim 1, wherein the attachment part of the dashboard panel for the vehicle body structure member includes a spot welded part that joins the vehicle body structure member to the dashboard panel, and the dashboard panel reinforcing plate is provided with a recess facing the spot welded part so as to space a part of the dashboard panel reinforcing plate corresponding to the recess away from the spot welded part.

6. The vehicle body front structure according to claim 1, wherein the dashboard panel reinforcing plate extends laterally of the vehicle body, and the attachment part of the dashboard panel for the vehicle body structure member and the attachment part of the dashboard panel for the component mounting part reinforcing plate are laterally spaced from each other.

7. The vehicle body front structure according to claim 6, wherein the attachment part of the dashboard panel for the vehicle body structure member includes a plurality of spot welds arranged laterally along an upper edge of the dashboard panel.

8. The vehicle body front structure according to claim 6, wherein the dashboard panel reinforcing plate includes a laterally elongated plate member positioned so as to be vertically offset from the attachment part of the dashboard panel for the vehicle body structure member.

9. The vehicle body front structure according to claim 8, wherein the dashboard panel reinforcing plate includes a pair of laterally elongated plate members positioned above and below the attachment part of the dashboard panel for the vehicle body structure member, respectively.

10. The vehicle body front structure according to claim 1, wherein the vehicle body structure member includes a damper housing of a front suspension device.

11. The vehicle body front structure according to claim 1, wherein the vehicle component includes a brake master cylinder.

12. The vehicle body front structure according to claim 1, wherein the dashboard panel reinforcing plate has a greater thickness than the dashboard panel.

13. The vehicle body front structure according to claim 1, further comprising a side panel extending vertically along a laterally outer edge of the dashboard panel, and the side panel is attached to the laterally outer edge of the dashboard panel by a plurality of spot welds arranged in a vertical row.

14. The vehicle body front structure according to claim 13, wherein a lateral edge part of the dashboard panel is provided with a front wheel house portion bulging toward a cabin of the vehicle, and the vehicle body front structure further includes a side reinforcing plate which is attached to both the side panel and the dashboard panel in a part of the lateral edge part of the dashboard panel adjacent to an upper end of the front wheel house portion.

* * * * *